(12) United States Patent
Cok

(10) Patent No.: US 7,271,378 B2
(45) Date of Patent: Sep. 18, 2007

(54) AMBIENT LIGHT DETECTION CIRCUIT WITH CONTROL CIRCUIT FOR INTEGRATION PERIOD SIGNAL

(75) Inventor: Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 178 days.

(21) Appl. No.: 10/736,340

(22) Filed: Dec. 15, 2003

(65) Prior Publication Data

US 2005/0127278 A1 Jun. 16, 2005

(51) Int. Cl.
*G01J 1/44* (2006.01)
*G09G 3/30* (2006.01)
*G06F 3/038* (2006.01)
*H04N 5/57* (2006.01)

(52) U.S. Cl. .................. 250/214 AL; 345/77; 345/207; 348/602; 348/603

(58) Field of Classification Search ......... 250/214 AL, 250/214 B, 214 R, 205; 345/63, 76–81, 345/207; 348/602, 603
See application file for complete search history.

(56) References Cited

U.S. PATENT DOCUMENTS

| 5,773,816 | A | | 6/1998 | Grodevant | .............. 250/214 R |
| 6,150,124 | A | * | 11/2000 | Riedel | .......................... 435/14 |
| 6,402,328 | B1 | * | 6/2002 | Bechtel et al. | .............. 359/603 |
| 6,489,631 | B2 | | 12/2002 | Young et al. | .................. 257/59 |
| 2002/0181112 | A1 | | 12/2002 | Bechtel et al. | .............. 359/604 |

FOREIGN PATENT DOCUMENTS

| EP | 1 281 943 | 2/2003 |
| JP | 2002/72920 | 3/2002 |
| JP | 2002/297096 | 10/2002 |
| JP | 2003/29710 | 1/2003 |

\* cited by examiner

*Primary Examiner*—Thanh X. Luu
(74) *Attorney, Agent, or Firm*—Andrew J. Anderson

(57) ABSTRACT

A circuit for detecting light is disclosed comprising: a) a light-integrating photo-sensor circuit having one or more thin-film photosensors and being responsive to a variable integration period signal and to ambient light for producing a photo signal representing the intensity of the ambient light, wherein the photo signal may be in one of at least three states including a no-signal state, an in-range state, and a saturated state; and b) a control circuit for receiving the photo signal and automatically increasing the period of the integration period signal when the photo signal is in the no-signal state and decreasing the period of the integration period signal when the photo signal is in the saturated state so as to result in the photo signal being in the in-range state and producing a corresponding ambient light signal. In particular embodiments of the invention, the circuit for detecting light is employed as a component of a flat panel display, and the ambient light signal is used for adjusting the brightness of the flat-panel display. The invention enables an improved dynamic range for thin-film photosensors, particularly when used with a flat-panel display.

18 Claims, 3 Drawing Sheets

AMBIENT LIGHT DETECTION CIRCUIT WITH CONTROL CIRCUIT FOR INTEGRATION PERIOD SIGNAL

FIELD OF THE INVENTION

The present invention relates to photosensor circuits and more particularly to solid-state flat-panel displays having photosensors for sensing ambient illumination.

BACKGROUND OF THE INVENTION

Flat-panel displays such as liquid-crystal displays (LCDs) or organic light emitting diode (OLED) displays are useful in a wide variety of applications under a wide variety of environmental conditions. When viewed in a dark environment (little ambient radiation), such displays need not be as bright as when viewed in a lighter environment (more ambient radiation). If the display light output is adjusted periodically to compensate for ambient light conditions, the display can maintain a constant relative brightness with respect to the ambient illumination even if the ambient illumination changes. In a bright environment, this will increase display brightness to improve visibility. In a dark environment, this will increase display device lifetime and reduce power usage by reducing unnecessary display brightness.

The use of photosensors with displays to detect ambient light and adjusting the brightness of the display in response to ambient illumination is known. Efficient silicon photosensors are available and generally provide a current proportional to the light incident on the sensor. These photosensors are constructed on silicon substrates and may have a wide dynamic range. Such sensors can be combined with displays to provide ambient sensing. For example, see JP2002-297096-A, which describes a circuit for providing ambient compensation to an electroluminescent display. However, as implemented, the sensor is separate from the display and senses the light at a single point. This increases the cost, number of components, and size of the device and does not directly measure the light incident on the display itself.

It is known to integrate a light sensor on an active-matrix display device for the purpose of sensing light emitted from the display device itself. See, for example, U.S. Pat. No. 6,489,631 issued Dec. 3, 2002 to Young et al., which describes a display having integrated photosensors for sensing light emitted by a light emitting element of the display. There is no disclosure of the use of such photosensors for detecting ambient light, however, and the arrangement of the sensor coupled with a light emitter limits the size of the photosensor and its ability to sense ambient light.

When providing ambient compensation to a display, it is important that the light sensing device provide a signal having a wide dynamic range representative of the ambient illumination. The human visual system can effectively detect light from very dark ambient conditions of only a few photons to very bright outdoor conditions greater than 75,000 lux. However, tests conducted by applicant demonstrate that photosensors constructed on flat-panel displays using thin-film technology do not have the efficiency of photosensors constructed on silicon substrates and do not have the sensitivity necessary to provide a signal representative of lower light levels, for example <100 cd/m2, where displays are often used. Nor do they have the dynamic range necessary to accommodate the range of the human visual system.

There is a need therefore for an improved photosensor circuit for the detection of ambient light, particularly within an active-matrix flat-panel display.

SUMMARY OF THE INVENTION

The need is met according to the present invention by providing a circuit for detecting light comprising: a) a light-integrating photo-sensor circuit having one or more thin-film photo sensors and being responsive to a variable integration period signal and to ambient light for producing a photo signal representing the intensity of the ambient light, wherein the photo signal may be in one of at least three states including a no-signal state, an in-range state, and a saturated state; and b) a control circuit for receiving the photo signal and automatically increasing the period of the integration period signal when the photo signal is in the no-signal state and decreasing the period of the integration period signal when the photo signal is in the saturated state so as to result in the photo signal being in the in-range state and producing a corresponding ambient light signal.

In particular embodiments of the invention, the circuit for detecting light is employed as a component of a flat panel display, wherein the display comprises a substrate and a plurality of light-emitting elements located thereon in a display area; and the one or more thin-film photosensors of the light-integrating photo-sensor circuit are located on the substrate, and being responsive to a variable integration period signal and to ambient light for producing a photo signal representing the intensity of the ambient light incident on the flat-panel display.

In a further embodiment, the invention is directed towards a method for controlling a flat-panel display, comprising: a) providing a flat-panel display comprising a substrate and a plurality of light-emitting elements located thereon in a display area; b) providing a light-integrating photo-sensor circuit having one or more thin-film photosensors located on the substrate and responding to a variable integration period signal and to ambient light for producing a photo signal representing the intensity of the ambient light incident on the flat-panel display, wherein the photo signal may be in one of at least three states including a no-signal state, an in-range state, and a saturated state; c) iteratively receiving the photo signal and automatically increasing the period of the integration signal when the photo signal is in the no-signal state and decreasing the period of the integration signal when the photo signal is in the saturated state so as to result in the photo signal being in the in-range state and producing a corresponding ambient light signal; and d) adjusting the brightness of the flat-panel display in response to the ambient light signal.

The invention enables an improved dynamic range for thin-film photosensors, particularly when used with a flat-panel display.

DETAILED DESCRIPTION OF THE INVENTION

Figure 1:
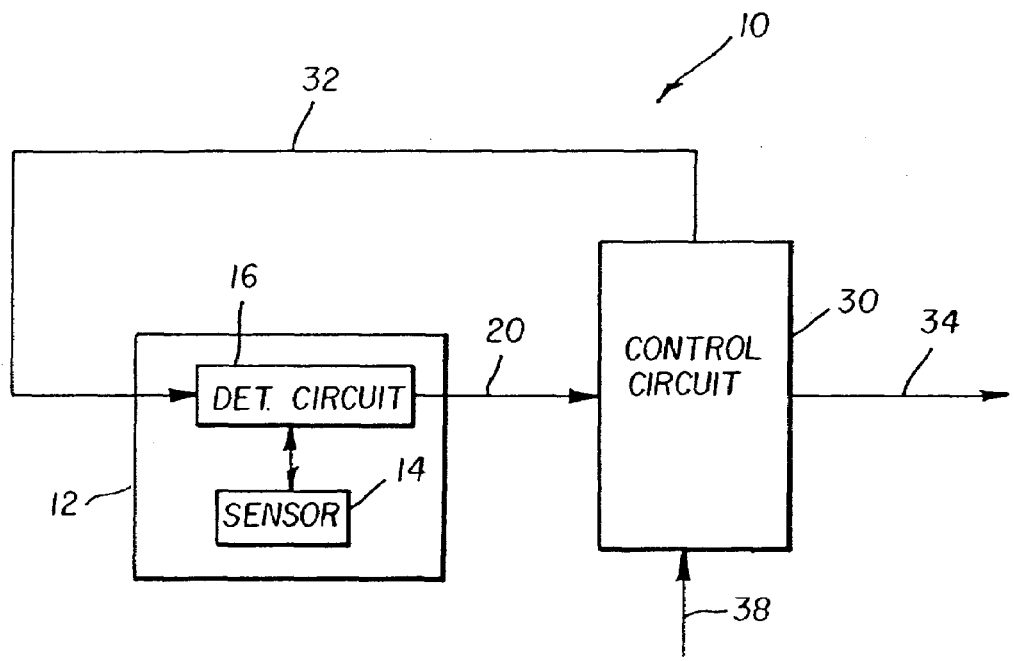
FIG. 1 is a schematic diagram of a photosensor circuit according to one embodiment of the present invention.

Referring to FIG. 1, the present invention includes a circuit 10 for detecting ambient light on a display comprising a light integrating photosensor circuit 12 having one or more thin-film photosensors 14 located on a flat-panel display substrate, connected to a detection circuit 16, and being responsive to an integration period signal 32 and to ambient light (as detected by photosensor 14) for producing a photo signal 20 representing the intensity of the ambient light incident on the flat-panel display. The photo signal has at least three states including a no-signal state, an in-range state, and a saturated state. A control circuit 30 receives the photo signal 20 and automatically increases the period of the integration signal 32 when the photo signal is in the no-signal state and decreases the period of the integration signal 32 when the photo signal is in the saturated state so as to maintain the photo signal in the in-range state.

Figure 2:
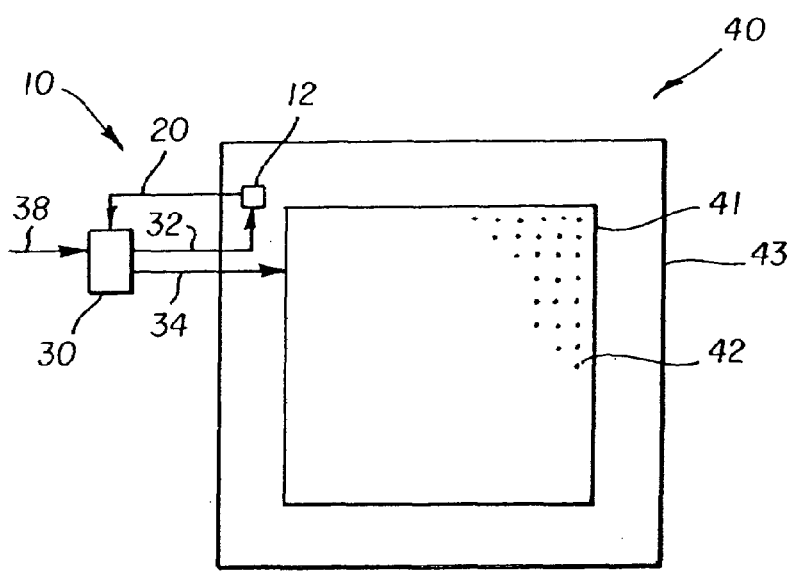
FIG. 2 is a schematic diagram of a display system utilizing the photosensor circuit of FIG. 1.

Referring to FIG. 2, a flat-panel display 40 includes a plurality of light emitters 42 in a display area 41 integrated on the flat-panel display substrate 43 and responsive to control signals 34 from the control circuit 30. The photosensor 14 is integrated on the same substrate as the light emitters 42. The detection circuit 16 may also be integrated with photosensor 14 in photosensor control circuit 12 on the same substrate, as shown in FIG. 2. The photo signal 20 produced by the photosensor circuit 12 is connected to the external control circuit 30. Alternatively, some or all of the control circuit 30 may be integrated on the substrate.

In operation, the control circuit 30 is responsive to an input signal 38 and drives the display using control signals 34. Ambient light incident on the display is also incident on the photosensor 14 and the photosensor circuit 12 produces a photo signal 20 representative of the amount of ambient light incident on the display. The photosensor circuit 12 is an integrating circuit, that is the circuit integrates a signal from the photosensor over a period of time to produce the photo signal 20. Such integrating circuits are more sensitive than circuits that directly detect current produced by a photosensor in the presence of light. The integration signal 32 specifies the period of the integration. The more frequent the integration signal, the shorter the integration period. The less frequent the integration signal, the longer the integration period.

The photo signal 20 is in one of at least three states. The first state is a "no-signal" state and is seen when so little ambient light is incident on the display 40 that any decrease in the ambient light will not further reduce the value of the photo signal 20. The second state is an "in-range" state and is seen when sufficient ambient light is incident on the display 40 to provide a photo signal 20 having a value representative of the ambient light incident on the display 40. The third state is a "saturated" state and is seen when so much ambient light is incident on the display 40 that any increase in the ambient light incident on the display 40 will not further increase the value of the photo signal 20. Because, as demonstrated by applicant, thin-film photosensors typically have a limited sensitivity and dynamic range, whenever the ambient light incident on the display 40 is out of the photosensor 14 range, the photo signal 20 will be in either a "no-signal" or "saturated" state.

The control circuit 30 responds to the photo signal 20 by adjusting the period of the integration signal 32. If the photo signal 20 is in a "no-signal" state, the integration period is increased to provide more time for the photo-sensor 14 to accumulate a signal representative of the ambient light incident on the display 40. If the photo signal 20 is in an "in-range" state, the period of the integration signal remains unchanged. If the photo signal 20 is in a "saturated" state, the period of the integration signal 32 is reduced to provide less time for the photo-sensor 14 to accumulate a signal responsive to the ambient light incident on the display 40. This process of adjusting the integration signal period is repeated until the photo signal 20 is in the "in-range" state. The value of the integration signal 32 period and the photo signal 20 together represent the amount of ambient light incident on the display 40. Once the photo signal is in-range, the control circuit 30 modifies the input signals 38 according to the value of the photo signal 20 to produce control signals 34 to drive the light emitters 42 and compensate for any ambient light incident on the display 40. When a relatively brighter ambient illumination is detected, the control signals 34 drive the light emitters 42 to produce a brighter display output. When a relatively darker ambient illumination is detected, the control signals 34 drive the light emitters 42 to produce a dimmer display output.

A suitable photosensor circuit is disclosed in co-pending, commonly assigned U.S. application Ser. No. 10/694,560, the disclosure of which is hereby incorporated by reference. The integration signal 32 may be a digital signal that periodically restarts the photosensor signal integration. The sensitivity to ambient illumination of this photosensor circuit may be adjusted by modifying the size of the photosensor or the value of the circuit components. When in the in-range state, the photo signal 20 output from the photosensor circuit is an analog value that represents the amount of ambient light incident on the display 40. When the output is at a ground voltage, the photo signal is in a "no-signal" state. When the output is at the voltage used to provide power to the circuit, the photo signal is in a "saturated" state. When the voltage is between zero and the power voltage, the photo signal is in the "in-range" state and represents the ambient illumination incident on the display.

The control circuit may be an analog control circuit and use analog techniques for controlling the period of the integration signal and modifying the input signal to produce a control signals 34 to compensate for ambient illumination. Such techniques are known in the art, for example using operational amplifiers, transistors, capacitor, and resistors.

Figure 3A:
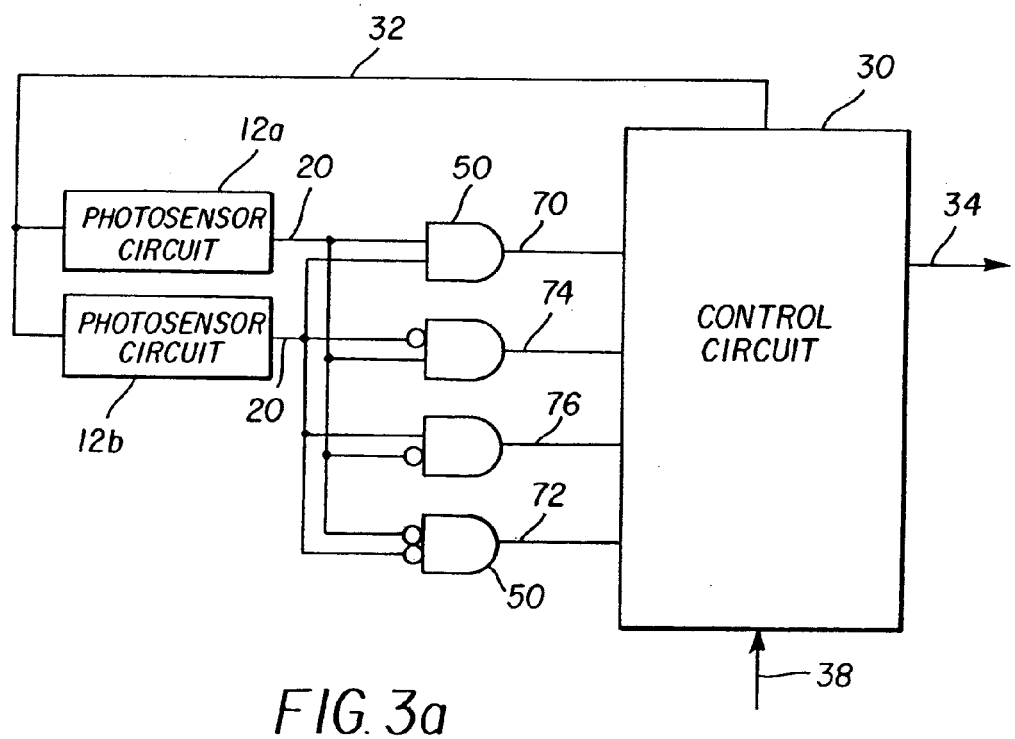
FIG. 3a is a schematic diagram of a photosensor and control circuit according to an embodiment of the present invention.

Alternatively, digital means may be employed to control the period of the integration signal. Referring to FIG. 3a, two photosensor circuits 12a (for relatively low light detection) and 12b (for relatively higher light detection) are employed having different sensitivities to ambient illumination. Different sensitivities may be obtained, for example, by adjusting capacitance in the photosensor circuit, by adjusting the size of the photosensor 14, by locating different filters over the photosensors, by using different periods for the integration signals, or by adjusting the aspect ratio or configuration of the photosensors.

The photo signals 20 may be applied to digital circuits such as an AND gate 50, as shown, with or without inverters. When applied to a digital circuit gate, the photo signal 20 will be in a saturation state when the photo signal 20 reaches the switching voltage for the gate. When the photo signal does not reach the switching voltage for the gate, it is in a "no-signal" state. Thus, the individual photo signals 20 indicate in one state that the ambient illumination incident on the display 40 generates a signal below the switching voltage and in the other state that the ambient illumination incident on the display generates a signal above the switching voltage. Taken together, however, the binary signals 70, 72, 74 and 76 output from the AND gates 50 represent four possible photo signal states. Thus, when both photo signals 20 are HIGH, the ambient illumination is above the threshold for the less sensitive photosensor circuit 12b, representing a saturation state with signal 70. When both photo signals 20 are LOW, then the ambient illumination is below the threshold for the more sensitive photosensor circuit 12a, representing a no-signal state with signal 72. When the photo signal 20 from the more sensitive circuit is HIGH and the photo signal 20 from the less sensitive photo-sensor circuit 12b is LOW, the ambient illumination is between the thresholds of the two photosensor circuits 12a, 12b, representing an in-range state with signal 74. When the photo signal 20 from the less sensitive circuit 12b is HIGH and the photo signal 20 from the more sensitive photo-sensor circuit 12a is LOW, there is an error state, represented by signal 76.

By adjusting the sensitivities of the two photosensor circuits 12a, 12b, and the period of the integration signal 32, any particular detection range may be obtained. For example, if one photosensor circuit is set with a switching threshold at ambient light levels of 1000 cd/m$^2$ and a second is set with a switching threshold at ambient light levels of 5000 cd/m$^2$, the circuit will detect three light levels: 0-1000 cd/m$^2$, 1000-5000 cd/m$^2$, and >5000 cd/M$^2$, for a given integration signal period. If the integration signal period is then reduced, for example by half, the three light levels may detect signals in the range of 0-500, 500-2,500, and >2,500 cd/M$^2$. Alternatively, the integration signal may be doubled so that the three light levels may detect signals in the range of 0-2,000, 2,000-10,000, and >10,000 cd/m$^2$.

If the signal from the two circuits does not indicate an in-range state, the period of the integration signal 32 may be adjusted until it does. If the sensitivity of the two photosensor circuits 12a, 12b are relatively close, for example differ by only 20%, the accuracy of the ambient light detection can be very good. In this case, by adjusting the period of the integration signal until an "in-range" state is achieved, the ambient illumination may be measured to an accuracy of 20%.

Figure 3B:
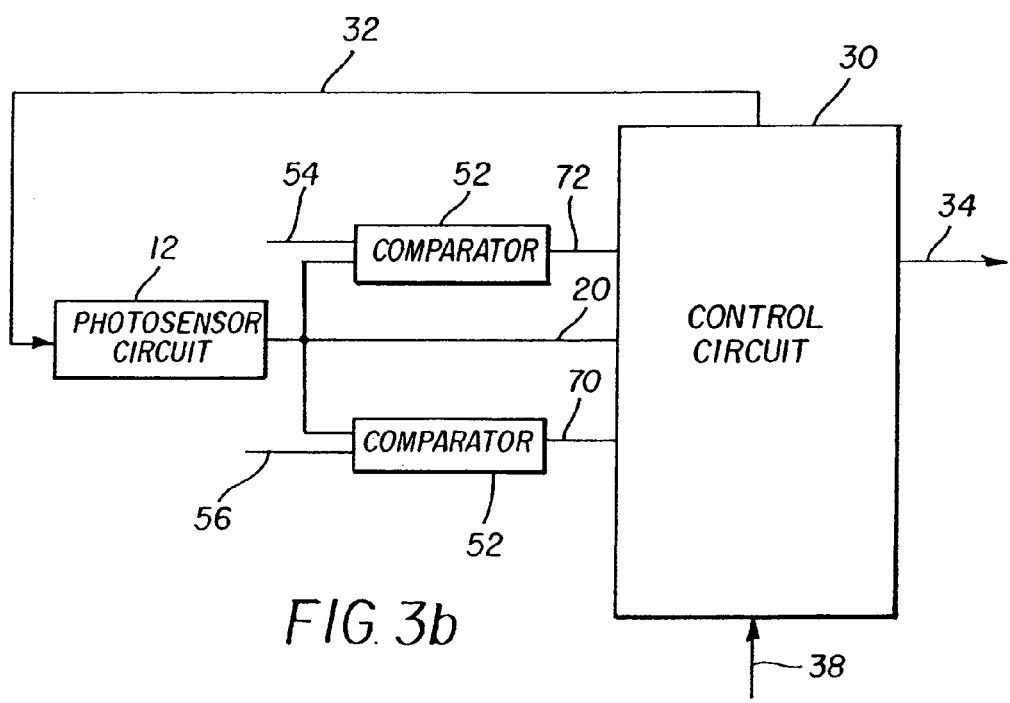
FIG. 3b is a schematic diagram of a photosensor and control circuit according to another embodiment of the present invention.

Referring to FIG. 3b, an alternative arrangement may be employed having a single photo-sensor 12. In this arrangement, external LOW signal 54 and HIGH signal 56 are compared to the photo signal 20 using comparators 52. If the photo signal 20 is comparable to the LOW signal 54, a no-signal state is indicated with signal 72. If the photo signal 20 is comparable to the HIGH signal 56, a saturated signal 70 is indicated. If neither state is indicated the photo signal 20 is in-range. In this case, the controller 30 receives three signals and responds as described above. The comparators 52 may include operational amplifiers and the controller 30 may digitize the analog photo signal 20 using analog-to-digital converters as is known in the art.

Figure 4:
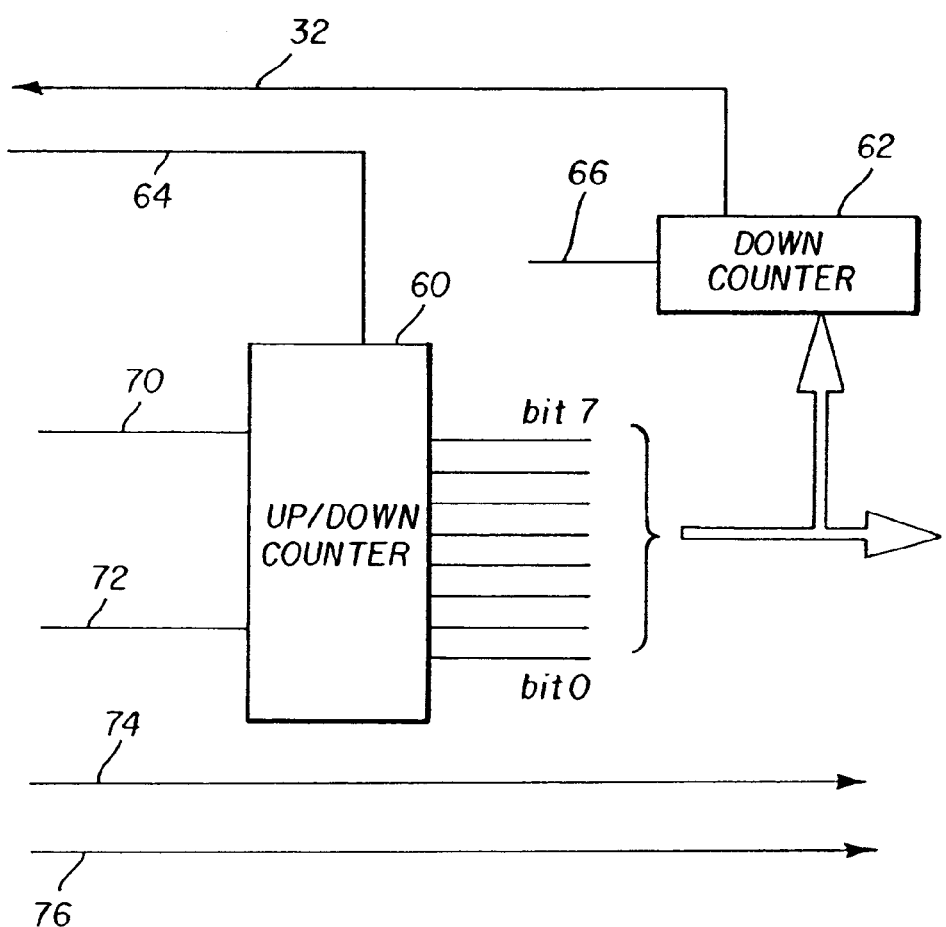
FIG. 4 is a schematic diagram of a control circuit according to an embodiment of the present invention.

A suitable digital mechanism for implementing an auto-ranging capability is shown in FIG. 4. Referring to FIG. 4, the saturation-state signal 70 and no-signal-state signal 72 from the AND gates 50 are connected to an up/down digital counter 60. The counter 60 stores a value representing the period of the integration signal 32. A clock signal 64 increments or decrements the value stored in the counter 60 depending on the state signals. The value of the counter (shown as an 8-bit value) is loaded into a down counter 62 (e.g., by using an inverse of the clock signal). A count signal 66 then decrements the down counter until it reaches 0 at which point the output of the down counter 62 provides the integration signal 32 to reset the photosensor circuit 12. The process is iterated until an "in-range" signal 74 is obtained. Counters, clock signals, and the digital logic necessary to implement such a circuit are well known in the art.

The thin-film photosensor 14 may be any thin-film light-sensitive device suitable for use within a flat-panel display system. For example, silicon or organic photodiodes, photocapacitors or phototransistors may be employed. Thin film materials may be deposited, e.g., by evaporation or photolithographic processes as known in the art (typically in layers less than 1 micrometer thick). These photosensors and circuit elements may be integrated with a flat panel display to provide an integrated solution. When integrated with a display, any portion of, or all of, the circuit 12 may be constructed using thin-film transistors and electrical components as are known in the flat-panel display art.

A typical flat panel display includes a rigid or flexible substrate, typically made of glass or plastic, together with a plurality of light-emitting elements, such as organic light emitting diode materials (OLEDs) or light controlling elements having polarizing layers in combination with an emissive back light, such as an LCDs. The individual light emitting elements may be controlled using thin-film transistors and capacitors together with an external controller to provide data, power, and timing signals.

A plurality of thin-film photosensors 14 can be electrically connected in common to provide one integrated photo signal or, alternatively, they can be separately addressed or their output combined. The plurality of photosensors 14 may be located near each other or dispersed over the flat-panel display 40. A greater number or size of integrated photosensors 14 can increase the signal, thereby improving the responsiveness of the ambient light detection. These may, or may not, have a common detection circuit 16 but will utilize a single control circuit 30. Moreover, the photo signals 20 will be more representative of the overall ambient illumination incident on the display since, if a portion of the display is shadowed, having several sensors can provide several signals that can be averaged to produce an overall average of the illumination incident on the display area.

The present invention may be used in both top- and bottom-emitting OLED flat-panel display devices. The light emitting display 40 may be an organic light emitting diode (OLED) display that includes multiple supporting layers such as light emitting layers, hole injection, hole transport, electron injection, and electron transport layers as is known in the art. Any or all portions of the photosensor circuit 12 may be deposited in a common step with active-matrix display circuitry and may include identical materials to simplify processing and manufacturing. As demonstrated by applicant, thin-film structures used for active-matrix OLED displays may be employed to form the photosensors 14 and detection circuit 16. There are a variety of ways in which the photosensors can be connected that depend on various factors such as the layout of the display and the conductivity of the electrodes and signal lines connected to the photosensors.

Any or all of the detector circuit 16 or control circuit 30 can be integrated directly onto the same substrate as the display device 40 or it can be implemented externally to the display 40. In general, higher performance and greater accuracy can be achieved by integrating the circuitry directly with the display device but this may not be desirable for all display devices.

In a preferred embodiment, the invention is employed in a flat-panel device that includes Organic Light Emitting Diodes (OLEDs) which are composed of small molecule or polymeric OLEDs as disclosed in but not limited to U.S. Pat.

No. 4,769,292, issued Sep. 6, 1988 to Tang et al., and U.S. Pat. No. 5,061,569, issued Oct. 29, 1991 to VanSlyke et al. Many combinations and variations of organic light emitting displays can be used to fabricate such a device.

The invention has been described in detail with particular reference to certain preferred embodiments thereof, but it will be understood that variations and modifications can be effected within the spirit and scope of the invention.

PARTS LIST 10 circuit
12 photosensor circuit
12a photosensor circuit
12b photosensor circuit
14 photosensor
16 detection circuit
20 photo signal
30 control circuit
32 integration signal
34 control signals
38 input signals
40 flat-panel display
41 display area
42 light emitters
43 display substrate
50 AND gate
52 comparator
54 LOW signal
56 HIGH signal
60 up/down counter
62 down counter
64 clock signal
66 count signal
70 saturation-state signal
72 no-signal-state signal
74 in-range-state signal
76 error-state signal

What is claimed is:

1. A circuit for detecting light comprising:
   a) a light-integrating photo-sensor circuit having one or more thin-film photosensors and being responsive to a variable integration period signal and to ambient light for producing a photo signal representing the intensity of the ambient light, wherein the photo signal may be in one of at least three states including a no-signal state, an in-range state, and a saturated state; and
   b) a control circuit for receiving the photo signal and automatically increasing the period of the integration period signal when the photo signal is in the no-signal state and decreasing the period of the integration period signal when the photo signal is in the saturated state so as to result in the photo signal being in the in-range state and producing a corresponding ambient light signal.

2. The circuit claimed in claim 1, wherein the photosensor is a photodiode.

3. The circuit claimed in claim 1, wherein the photosensor is a photo capacitor.

4. The circuit claimed in claim 1, wherein the photosensor is a phototransistor.

5. The circuit claimed in claim 1, wherein the photosensor is an organic photosensor.

6. The circuit claimed in claim 1, wherein the photosensor is a silicon photosensor.

7. The circuit claimed in claim 1, wherein the photo-signal states are represented by digital signals.

8. The circuit claimed in claim 1, wherein the photo-signal states are represented by analog signals.

9. The circuit claimed in claim 1, wherein the value of the integration period signal is stored as a digital value.

10. The circuit claimed in claim 1, wherein the integration period signal is generated by a digital counter.

11. The circuit claimed in claim 1 further comprising a plurality of photosensor circuits producing a plurality of respective photo signals and wherein the control circuit is responsive to the plurality of photo signals.

12. A flat-panel display, comprising
   a) a substrate and a plurality of light-emitting elements located thereon in a display area; and
   b) a circuit for detecting light incident on the flat-panel display comprising:
      i) a light-integrating photo-sensor circuit having one or more thin-film photosensors located on the substrate and being responsive to a variable integration period signal and to ambient light for producing a photo signal representing the intensity of the ambient light incident on the flat-panel display, wherein the photo signal may be in one of at least three states including a no-signal state, an in-range state, and a saturated state; and
      ii) a control circuit for receiving the photo signal and automatically increasing the period of the integration period signal when the photo signal is in the no-signal state and decreasing the period of the integration period signal when the photo signal is in the saturated state so as to result in the photo signal being in the in-range state and producing a corresponding ambient light signal.

13. The circuit claimed in claim 12, wherein the photosensor circuit includes a detector circuit and wherein the detector circuit and/or the control circuit is a thin-film device located on the substrate.

14. The circuit claimed in claim 12, wherein the photosensor circuit includes a detector circuit and wherein the detector circuit and/or the control circuit are located externally to the substrate.

15. The flat-panel display claimed in claim 12, wherein the display area is rectangular and the photosensor is located at an edge or a corner of the rectangular display area.

16. The display claimed in claim 12, wherein the light emitting elements are organic light emitting diodes.

17. The display claimed in claim 12 further comprising a plurality of photosensor circuits producing a plurality of respective photo signals and wherein the control circuit is responsive to the plurality of photo signals.

18. A method for controlling a flat-panel display, comprising:
   a) providing a flat-panel display comprising a substrate and a plurality of light-emitting elements located thereon in a display area;
   b) providing a light-integrating photo-sensor circuit having one or more thin-film photosensors located on the substrate and responding to a variable integration period signal and to ambient light for producing a photo signal representing the intensity of the ambient light incident on the flat-panel display, wherein the photo signal may be in one of at least three states including a no-signal state, an in-range state, and a saturated state;
   c) iteratively receiving the photo signal and automatically increasing the period of the integration signal when the photo signal is in the no-signal state and decreasing the period of the integration signal when the photo signal is in the saturated state so as to result in the photo signal being in the in-range state and producing a corresponding ambient light signal; and d) adjusting the brightness of the flat-panel display in response to the ambient light signal.

* * * * *